3,267,073
HYDROPHILIC REDOX VINYL POLYMERS CONTAINING QUINONE GROUPS
Kenneth A. Kun, Riverton, N.J., assignor to Rohm & Haas Company, Philadelphia, Pa., a corporation of Delaware
No Drawing. Filed Sept. 4, 1962, Ser. No. 221,356
16 Claims. (Cl. 260—47)

This application is a continuation-in-part of Serial No. 191,714, filed May 2, 1962, and now Patent No. 3,173,892.

This invention concerns polymers known as redox or electron exchange polymers inasmuch as they can be reversibly oxidized and reduced. More specifically, it concerns resins prepared by reacting a halomethylated cross-linked copolymer with quinones, hydroquinones or lower dialkyl ethers or esters of hydroquinones followed by the addition of hydrophilic groups. When dialkyl ethers of hydroquinones are used, the alkyl groups are removed from the hydroquinone moiety.

Many of the redox polymers of the prior art are hydrophobic which results in low capacities and low rates of reactivities in aqueous systems. An object of this invention is to provide redox polymers which have high capacities and high rates of reaction in aqueous and other polar solutions.

Many of the redox polymers of the prior art exhibited insufficient physical and chemical stability and another object of the present invention is to provide hydrophilic redox polymers that are characterized by high physical and chemical stability.

A variety of cross-linked synthetic organic reversible oxidation-reduction polymers are described in the literature with the common characteristic of being hydrophobic. For general applications involving the use of redox polymers, particularly in non-aqueous media, the redox polymers described in our copending application, Serial No. 191,714, are quite useful. This is particularly true of the macroreticular-structured redox polymers described in the above-noted application in that they have much greater reactivity than redox polymers having conventional gel type structures. However, for use in aqueous systems, the hydrophobic character of these redox polymers is a limitation on their use.

The advantage of the hydrophilic cross-linked synthetic organic reversible oxidation-reduction polymers described in this application as compared to previously described redox polymers is the surprisingly high rates of reactivity and capacities found.

Redox polymers that are characterized by being hydrophilic are known in the prior art. Cassidy in U.S. Patent No. 2,700,029 describes copolymers formed from monomeric vinyl hydroquinone and monomeric vinyl pyridine. In U.S. Patent 2,900,353 and in the J. Am Chem. Soc., 78, 2525 (1956), Cassidy and Ezrin report materials having combined electron- and ion exchange properties. They describe sulfonated vinyl hydroquinone polymers characterized by being hydrophilic and of "the type which are insoluble in water but capable of being swollen thereby." Luttinger and Cassidy report in the J. Polymer Sci., 20, 417 (1956) and 22, 271 (1956), the ion exchange and electron exchange behavior of hydrophilic hydroquinone copolymers where the hydrophilicity is due to sulfonation of the redox polymer.

The chemical advantage of polymeric macroreticular hydroquinone-quinone structures described in this application as compared to the prior art are not only greater reactivity due to increased availability of reaction sites, but also due to increased rates of diffusion of reactants to reaction sites.

Another advantage of polymeric hydrophilic redox structures described in this application is the ease of preparation by adding readily available redox groups to polymeric matrices instead of exotic monomers, vinyl hydroquinone and its derivatives, which are copolymerized with monomers having hydrophilic characteristics.

When in the reduced form, the resins of the present invention show increased reactivity and capacity for removing oxygen from water as compared to the hydrophobic resins. Such oxygen-free water is generally used for boiler feed. The oxygen can be destroyed by sulfites, etc., but by using the resins of the present invention, foreign substances are not added to the water. This is particularly important when boilers are operated at very high pressures.

When the resins of the present invention are in the reduced form, they can be used as polymerization inhibitors for ethylenically unsaturated monomers. When they are in the oxidized form, they can be used, with the appropriate co-reactants, as polymerization catalysts for ethylenically unsaturated monomers.

The halomethylated copolymer is prepared as set forth in U.S. Patent 2,629,710 and the information therein is incorporated herein by reference. The preferred embodiment is a copolymer of styrene and divinylbenzene, in which the divinylbenzene content can be from 1% to 55% of the total monomer mixture. While such copolymers are particularly advantageous from the standpoint of economy and availability, other monoethylenically unsaturated monomers may be substituted for all or part of the styrene. Thus, vinyl toluene, α-methylstyrene, and vinyl naphthalene can be substituted for the styrene. Part of the styrene may be replaced with alkyl esters of acrylic or methacrylic acid.

Cross-linkers other than divinylbenzene, such as divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, polyvinyl or polyallyl ethers of glycol, of glycerol, of pentaerythritol, of mono- or dithio-derivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylendimethacrylamide, N,N'-methylenediacrylamide, N,N'-methylene-dimethacrylamide, N,N'-ethylenediacrylamide, 1,2-bis-(α-methylmethylene sulfonamido) ethylene, trivinylbenzene, trivinylnaphthalene, and polyvinylanthracenes, can also be employed. These cross-linkers generally constitute from 1% to 55% of the monomer mixture.

Particularly preferred types of polymers are those which possess what is now known as a macroreticular structure. While it is frequently stated that all gel ion exchange resins have micropores, the important porosity in the macroreticular-structured resin is not contributed by such micropores. It is macroporous in the true sense and is characterized by high specific surface. With the conventional or so-called gel type resins, the specific surface as measured by the Brunnauer, Emmett and Teller method is always less than 1 sq. m./g. and is limited to the surface derived from the geometry of the particles. With the resins which possess macroreticular structure, the specific surface, also measured by the Brunnauer, Emmett and Teller method, is always in excess of 1 sq. m./g. and can be as high as 300 sq. m./g. The specific surface value depends on several variables and is proportional to the amount of cross-linker and the amount of "precipitant" (described hereinafter) which is employed; the highest values for specific surface are obtained at high cross-linker and high "precipitant" contents.

These resins are prepared by polymerizing a mixture of a monoethylenically unsaturated monomer and a polyethylenically unsaturated monomer in the presence of a substance, designated the "precipitant" which is a solvent for the monomer mixture, but does not swell nor is imbibed by the cross-linked polymer so formed. As the copolymerization reaction proceeds and the amount of monomer in the mixture decreases, it is postulated that the added liquid, not being able to dissolve in the copolymer, forms minute channels of liquid within the overall solid particle. When the copolymerization is complete and the liquid is removed, the particle has true macroporosity as shown by the measurement of its specific surface.

Compounds which can cause this macroreticular structure in mono-vinylaromatic-polyvinylaromatic monomer mixtures include alkanols with a carbon content of from 4 to 10, such as n-butanol, t-amyl alcohol and decanol. Higher saturated aliphatic hydrocarbons, such as heptane and isooctane, also give the desired effect when used in amounts sufficient to cause phase separation. Typical preparations of macroreticular-structured resins are described in the preparations.

In the absence of this material which causes phase separation, the so-called conventional copolymers are obtained which do not have the macroreticular structure and which have very low specific surface. Such copolymers, when halomethylated, can be reacted with dialkyl ethers of hydroquinones or with quinones or with hydroquinones to form redox polymers.

The copolymers are halomethylated by treatment with halomethyl ether and a Friedel-Crafts reagent, such as zinc chloride, or aluminum chloride, generally in a swelling solvent, such as ethylene dichloride. Whereas bromomethyl ether can be employed as the halomethylating agent, chloromethyl ether is preferred because of availability and economy. The halomethylated copolymer is then reacted with a dialkoxybenzene (such as hydroquinone dimethyl ether), preferably in a solvent which will swell the halomethylated beads, ethylene dichloride being typical. The dimethyl adduct is then cleaved with an agent such as hydrogen iodide to give the hydroquinone. Whereas other para-dialkoxybenzenes can be used, the dimethoxy compound is preferred since it is available and lower in cost than the other members of the series. Since the dialkoxy group is not present in the final product, the particular group used is not important from a chemical standpoint.

It is necessary that catalysts be used to effect the reaction of either quinones, hydroquinones, or the dialkyl ethers of hydroquinones, and any Friedel-Crafts reagents, frequently known as Lewis acids, will function. Typical of these are zinc chloride, stannic chloride, aluminum chloride, ferric chloride and boron trifluoride. Zinc chloride represents the preferred catalyst. The amount used is not critical, from about 0.5% on the weight of the reactants to about 5% on the weight of reactants has been found to be adequate.

The reaction temperature can vary from 5° C. to 100° C. and it is frequently convenient to run at reflux temperature. Thus, using ethylene dichloride as solvent, the reaction temperature is about 90° C. A preferred range is from about 5° C. to 90° C.

Macroreticular-structured redox polymers can also be prepared by treating a macroreticular-structured copolymer having halomethyl groups attached thereto with thioureas or alkali metal hydrosulfides. Frequently, it is desired to increase the hydrophilicity of these resins, and, sometimes, for specific applications, it is desired to have anion exchange capacities in addition to the redox properties.

Anionic groups can be introduced by reacting only part of the halomethyl groups on the macroreticular-structured polymer with quinones or hydroquinones or dialkyl ethers or esters thereof and ionic groups can also be introduced into the macroreticular thio-type redox polymers to increase their "wettability" and to impart anion exchange properties thereto. In this case, also, some of the halomethyl groups are unreacted as redox sites, and are, therefore, available for amination. The remaining halomethyl groups can then be aminated in the usual fashion with a primary, secondary, or tertiary amine. The resulting polymer not only shows redox properties, but it is also more easily wetted and swollen by water and other polar solvents. In addition, it has anion exchange capacity, and functions as a combination redox-anion exchange resin. From 3% to 50% of the halomethyl groups on the polymer backbone can be aminated, thus giving a variable and controllable ratio between the reduction-oxidation capacity of the resin and the anion exchange capacity.

In a like manner, by leaving some of the halomethyl groups available for further reaction, it is possible to introduce other polar groups into the polymer chain. Thus, the halomethyl groups remaining can be reacted with glycolic acid to form a redox polymer with carboxylic cation exchange activity. The presence of the carboxylic group also increases the wetting and swelling properties of the resin in polar liquids such as water.

Particularly in the case of the hydroquinone-quinone redox polymers, besides adding polar groups to the halomethyl groups, they can be added directly to the redox group or polymeric matrix itself. Treatment of a hydroquinone-quinone redox polymer with chlorosulfonic acid places sulfonic acid groups directly on the hydroquinone ring. This has the added advantage of introducing hydrophilic groups to the hydrophobic resin without using halomethyl groups, thus not lowering the potential redox capacity of the resin.

Redox resins which possess anionic or cationic activity, and depending on the composition of the surrounding medium in which the resin is being used, may alter the pH of the medium, thus altering the oxidation-reduction potential of the redox group.

While for the purposes of illustration, we hereinbefore have referred to benzoquinone and the dialkyl ethers of hydroquinone as the reagents adding to the chloromethylated backbone polymer, actually there are a large number of quinones, hydroquinones and quinone derivatives which function satisfactorily. Thus, both the ortho- and para-benzoquinones and alkyl and halogen-substituted modifications are reactive as long as there is one hydrogen in the ring available for reaction with the chloromethyl group. This means the mono-, di-, and tri-substituted benzoquinones can be employed. Alpha- and beta-naphthoquinones can also be employed and again can be extensively substituted with alkyl and halogen groups as long as there is one hydrogen on an aromatic ring available for substitution. Anthraquinones and substituted anthraquinones can also be employed in the process of the present invention with the limitation that there must be one hydrogen in an aromatic ring which is available for substitution. Where sulfonic acid derivatives are required for completely substituted hydroquinone-quinone systems, the chlorosulfonic acid will react with the styryl units of the polymeric matrix. Though this reaction is not as rapid as the sulfonation of a hydroquinone group, the reaction will proceed to yield a sulfonic acid derivative.

The hydroquinones corresponding to the above-noted quinones are also satisfactory and it is sometimes desirable to protect the hydroxyl groups during the reaction by employing the dialkyl ethers or the dialkyl esters. The dibenzoates of these hydroquinones can also be employed, the two benzoyl radicals being cleaved after the addition to the polymer chain.

Typical of the quinones which can be used are the following: toluquinone, 2,3 - dimethylbenzoquinone, 2,5-dimethylbenzoquinone, 2,6 - dimethylbenzoquinone, 2,3,5-trimethylbenzoquinone, 2,5 - diethylbenzoquinone, 2,6-diethylbenzoquinone, 2,5 - diphenylbenzoquinone, 2,6-diphenylbenzoquinone, 5 - tert - butylbenzoquinone, n- amylbenzoquinone, dodecylbenzoquinones, ethylbenzoquinones, 5 - ethyltoluquinone, 6 - ethyltoluquinone, 5-ethyl - p - xyloquinone, hexadecylquinones, isopropylquinones, phenylquinones, n - propylquinones, 5 - propyltoluquinones, fluoroquinones, chloroquinones, bromoquinones, 2,3 - dichloroquinone, anthraquinones, 1-bromoanthraquinones, 2-bromoanthraquinone, 1-chloroanthraquinone, 2 - chloroanthraquinone, 2,7 - dichloroanthraquinone, 2,7 - dibromoanthraquinone, 2 - methylanthraquinone, 2 - ethylanthraquinone, 1 - aminoanthraquinone, phenanthraquinone, 2 - methyl - 1 - nitroanthraquinone, 4 - bromo - 1 - methylaminoanthraquinone, 1 - amino - 4 - hydroxyanthraquinone, 1,2 - dihydroxyanthraquinone, 1,2 - naphthoquinone, 1,4 - naphthoquinone, 2 - methylnaphthoquinone, 2 - aminonaphthoquinone, and mixtures thereof.

The hydroquinones corresponding to the quinones set forth in the preceding paragraph may also be used.

Thus, it is seen that this addition to chloromethylated polymer backbone chains is broadly applicable to a wide variety of quinones, hydroquinones and the substituted compounds corresponding thereto. It is also clear that the hydroquinones may be in the form of alkyl ethers or alkyl esters or an aromatic ester, such as benzoate.

The oxidized form of the redox resin of the present invention, i.e. the quinone form, is easily reduced by treatment with a reducing agent, such as 10% aqueous sodium bisulfite. Sodium thiosulfate may also be used. The reduced, or hydroquinone form of these redox resins, can be readily oxidized to the quinone form by treatment with the solutions of such oxidizing agents as iodine, ceric chloride or ceric sulfate, ferric sulfate, potassium permanganate, etc.

The interconvertibility of the two forms of redox resins is well-known in the art, and does not constitute the present invention.

The redox capacities given in the following examples are determined by determining the amount of ceric ion which is reduced by the hydroquinone form of the resin. The capacities are expressed in milliequivalents of ceric ion reduced per gram (dry weight) of resin.

Preparations I to IV describe various macroreticular structured copolymers which were prepared by copolymerizing in the presence of a liquid which was a solvent for the monomer mixture, and which would not swell or be imbibed by the copolymer. The preparation of typical macroreticular-structured copolymers is set forth hereinbefore. These macroreticular-structured copolymers are characterized by high porosity and high specific surface, and the redox polymers based thereon represent the preferred embodiment of this invention. Because of their high specific surface, they are characterized by rapid reaction rates and high capacities.

The differences which exist between the hydrophobic and the hydrophilic forms of the various resins with respect to reaction rate are clearly set forth in Table I.

Several factors are apparent from the data present in this table. In all cases, whether the resin has a macroreticular structure, or whether it is a conventional gel type structure, the hydrophobic form of the resin shows a lower reaction rate. Thus, Resin A, which was a 3% divinylbenzene-styrene chloromethylated and subsequently reacted to replace the chlorine with quinone or hydroquinone, after ten minutes shows a capacity of only 0.52 meq./g. dry resin. By contrast, the same resin which had been treated with chlorosulfonic acid to place sulfonic acid groups on the polymer chain, showed a capacity of 2.44 meq./g. dry resin after ten minutes contact. The same resin, in which the residual chloromethyl groups had been aminated, showed a capacity of 2.04 meq./g. of dry resin.

Comparing resins of macroreticular structure with the conventional gel type shows (Resin A versus Resin D, both at the same cross-linker content) that the reaction rate for the conventional resin is much slower both in the hydrophobic and the hydrophilic forms.

TABLE I.—COMPARATIVE REACTIVITIES OF HYDROPHOBIC AND HYDROPHILIC REDOX POLYMERS

| Redox Polymer | Cross-linker percent | Contact Time with 0.1 N $Ce^{+4}$ in 1 N $H_2SO_4$ (Capacities are in meq./g. of dry resin) | | | |
|---|---|---|---|---|---|
| | | 10 min. | 1 hour | 4.3 hours | 27 hours |
| A-hydrophobic | 3 | 0.52 | 0.71 | 1.27 | 2.90 |
| A-sulfonated | 3 | 2.44 | [1] 7.28 | 11.94 | 14.99 |
| A-aminated | 3 | 2.04 | 4.63 | 8.76 | 15.2 |
| B-hydrophobic | 3 | ---------- | 3.90 | [2] 5.40 | 8.20 |
| B-sulfonated | 3 | ---------- | 4.63 | 8.76 | 15.44 |
| C-hydrophobic | 20 | 1.38 | 1.74 | 2.24 | 3.03 |
| C-sulfonated | 20 | ---------- | 1.99 | 2.76 | 4.00 |
| C-aminated | 20 | 1.88 | 3.89 | 6.17 | 9.31 |
| D-hydrophobic | 3 | 0.10 | ---------- | [2] 0.14 | 0.20 |
| D-aminated | 3 | 1.23 | 3.15 | [2] 4.60 | 7.97 |

Resins A, B and C have the macroreticular structure while Resin D has the conventional gel type structure.
[1] 1.5 hours.
[2] 4 hours.

The surface area of the macroreticular redox resins described in this invention is from at least 10 to 500 times greater than that of typical gel-type resins described in the prior art. The rate of reaction of the macroreticular resins is also from at least 10 to 500 times greater than those of typical gel-type resins.

The following examples set forth certain well-defined embodiments of the application of this invention. They are not, however, to be considered as limitations thereof, since many modifications may be made without departing from the spirit and scope of this invention.

PREPARATION I

A mixture of 121.6 grams of styrene, 38.4 grams of divinylbenzene (technical grade containing 50.3% active ingredient), 87.0 grams of tertiary-amyl alcohol and 1.0 gram of benzoyl peroxide is charged to a solution of 6.5 grams of sodium chloride and 0.5 gram of the ammonium salt of a commercial styrene-maleic anhydride copolymer in 174 grams of water. The mixture is agitated until the organic components are dispersed as fine droplets and then heated at 86° C. to 88° C. for six hours. The resultant polymer pearls are filtered, washed with water and freed from excess water and amyl alcohol by drying at elevated temperature. The product is obtained in the form of white opaque spherical particles weighing 145 grams. This copolymer is chloromethylated as described in U.S. Patent 2,629,710.

PREPARATION II

The procedure of Preparation I was employed with the exception that 182.4 grams of styrene, 27.8 grams of trivinylbenzene (containing 97.3% active ingredient), 130.5 grams of tertiary-amyl alcohol and 2.0 grams of benzoyl peroxide are charged to a solution of 9.8 grams of sodium chloride and 0.8 grams of ammonium salt of a commercial styrene-maleic anhydride copolymer in 261 grams of water. Reaction yields 189.2 grams of white opaque spherical particles that are chloromethylated so described in U.S. Patent 2,629,710.

PREPARATION III

The procedure of Preparation II was employed with the exception that the reacting monomers are 137.8 grams of vinyl toluene and 88.7 grams of ethylene glycol dimethacrylate.

PREPARATION IV

The procedure of Preparation I was employed with the exception that the reacting monomer used is 198.3 grams of vinyl naphthalene and 38.4 grams of divinylbenzene (containing 50.3% active ingredient).

PREPARATION V

To a one-liter, three-neck round bottom flask, fitted with a stirrer, reflux condenser and thermometer is added 152.6 grams of chloromethylated poly(styrene-divinylbenzene) prepared from a styrene-divinylbenzene copolymer containing 3% divinylbenzene, by conventional methods, by chloromethylation with chloromethyl ether. It contained 21.7% chlorine. Two hundred ml. of ethylene dichloride and 152.0 grams of p-dimethoxybenzene are added to the chloromethylated polymer beads. The mixture is stirred for several minutes and 2.7 grams of zinc chloride (freshly fused powder) is added. The reaction mixture is heated with continuous stirring, at reflux temperature, 90° C., for twenty-four hours. At the beginning of the heating period, the beads take on a dark brown color and retain this color throughout the entire reflux period. Hydrogen chloride is given off during the reaction. At the end of the reflux period, the ethylene dichloride is drained off. The beads are washed in ethylene dichloride and then washed with water. The beads now lose the brown appearance they had through the reflux period and are again tan in color. To insure the removal of unreacted p-dimethoxybenzene, a steam distillation is employed to remove all residual volatile impurities from the beads. The dried reaction product contained 17.3% methoxyl, 1.57% residual chloride and 1.44% ash. Cleavage of the protecting ether groups may be run on the dried beads or directly on the wet beads after draining the water from the steam distillation. To the beads, 300 grams of 47% hydriodic acid is added. This mixture is stirred and heated at reflux temperature, 110° C., for sixteen hours. The beads are drained, washed with water until the washings are neutral to pH paper, and dried to constant weight. This reaction gave 196.6 grams of cross-linked poly(vinylbenzylhydroquinone) redox polymer. The redox capacity was 4.2 meq./g.

PREPARATION VI

To a one-liter three-necked round bottom flask, fitted with a stirrer, reflux condenser and thermometer is added 50.0 grams of chloromethylated poly(styrene-divinylbenzene) beads (containing 3% divinylbenzene and prepared by chloromethylation with chloromethyl ether) to a solution of 55.0 grams of 2,5-dimethoxytoluene in 100 ml. of ethylene dichloride and the mixture is stirred for one-half hour at room temperature. One gram of zinc chloride dissolved in three ml. of ethylene dichloride is added. With continuous stirring, the reaction mixture is refluxed for twenty-four hours at 92° C. At the end of the reflux period, the ethylene dichloride is drained off. The beads are washed in ethylene dichloride and then washed with water. The beads now lose the brown appearance they had during the reaction and are again tan. To insure the removal of unreacted dimethoxytoluene, a steam distillation is employed to remove all residual volatile impurities from the beads. The dried reaction product contained 15.60% methoxyl and less than 1% ash. Cleavage of the protecting ether groups may be run on the dried beads or directly on the wet beads after draining the water from the steam distillation. To the beads, 300 grams of 47% hydriodic acid is added. This mixture is stirred and heated at reflux temperature, 110° C., for sixteen hours. The beads are drained of acid, washed with water until the washings are neutral to pH paper and dried to constant weight. They were cleaved with hydrogen iodide as in Preparation I and had a redox capacity of 2.9 meq./g.

PREPARATION VII

To a one-liter three-neck round bottom flask, fitted with a stirrer, reflux condenser and thermometer is added 50 grams of chloromethylated poly(styrene-divinylbenzene) beads containing 3% divinylbenzene with 80 grams of p-benzoquinone in 325 ml. of ethylene dichloride. One gram of zinc chloride is added. With continuous stirring, the reaction mixture is refluxed for eighteen hours at 92° C. At the end of the reflux period, the ethylene dichloride is drained off. The beads are washed in ethylene dichloride and then washed with water. To insure the removal of unreacted p-benzoquinone and the remaining ethylene dichloride, a steam distillation is employed to remove all residual volatile impurities from the beads. The product, a mixture of cross-linked poly(vinylbenzylhydroquinone) and cross-linked poly(vinylbenzylbenzoquinone), is isolated by filtration and dried to constant weight. Treatment of the mixture with oxidizing agents gives poly(vinylbenzylbenzoquinone), while treatment with a reducing agent gives poly(vinylbenzylhydroquinone). This reaction gave 82.5 grams of material. The redox capacity was 2.8 meq./g.

PREPARATION VIII

To a two-liter, three-neck round bottom flask fitted with a stirrer, reflux condenser and thermometer, was added 75.0 grams of macroreticular-structured chloromethylated poly(styrene-divinylbenzene) prepared from a styrene-divinylbenzene copolymer containing 3% divinylbenzene by chloromethylation with chloromethyl ether. It contained 20.65% chloride, had a surface area of 8.0 m.$^2$/g. and a porosity of 36%. A solution of 100 grams of 2,5-dimethylbenzoquinone in 375 ml. of ethylene dichloride was added with stirring. When the beads were completely solvated, 1.90 grams of zinc chloride was added. The reaction mixture was heated to reflux, then stirring and refluxing was continued for 24 hours at 81° C. After cooling the reaction mixture, the ethylene dichloride solution was drained off and the beads were washed three times with fresh ethylene dichloride. Last traces of ethylene dichloride and benzoquinone were removed by steam distillation. Distillation was continued until a colorless aqueous distillate was obtained for a period of one-half hour. Non-volatile impurities were removed by extracting the beads with hot ethanol for 8 hours in a Soxhlet extractor. Product was dried to constant weight at 80° C.

Analytical results for this preparation showed the product to have a redox capacity of 4.3 meq./g.

PREPARATION IX

To a two-liter, three-neck round bottom flask fitted with a stirrer, reflux condenser and thermometer, was added 75.0 grams of macroreticular-structured chloromethylated poly(styrene-divinylbenzene) prepared from a styrene-divinylbenzene copolymer containing 20% divinylbenzene by chloromethylation with chloromethyl ether. It contained 13.07% chloride, had a surface area of 60.3 m.$^2$/g. and a porosity of 38%. The preparation was run exactly like Preparation VIII. The redox capacity of this material was 3.2 meq./g.

PREPARATION X

To a five hundred milliliter, three-neck round-bottom flask fitted with a stirrer, reflux condenser and thermometer, was added 30 grams of chloromethylated poly(styrene-divinylbenzene) prepared from a styrene-divinylbenzene copolymer containing 3% divinylbenzene by chloromethylation with chloromethyl ether. It contained 20.23% chloride, had a porosity of 51% and a surface area of 25 m.$^2$/g. Hydroquinone (50 grams), 1.0 gram of zinc chloride and 200 ml. of dioxane were added to the beads and the resulting mixture was heated at reflux, with constant stirring, for sixteen hours. After cooling the reaction mixture, the dioxane solution was removed by filtration and the beads were washed with water followed by a methanol wash. The drained beads were washed for 4 hours with hot ethanol in a Soxhlet extractor to remove the last traces of unreacted hydroquinone. Product was dried to constant weight at 120° C. to yield a material having a redox capacity of 6.0 meq./g. and contained 82.27% C, 6.44% H, 1.51% residual chloride and no ash.

PREPARATION XI

The procedure of Preparation VII was employed with the exception that 40 grams of benzoquinone and 250 ml. of ethylene dichloride was added to 30 grams of chloromethylated polystyrene-divinylbenzene prepared from a styrene-divinylbenzene copolymer containing 50% divinylbenzene. It contained 10.66% chloride, had a porosity of 30% and a surface area of 250 sq. m./g. The catalyst used was 1.36 grams of fused zinc chloride. Analytical results for this preparation showed the product to have 77.05% C, 6.37% H, 4.35% residual chloride, and 0.29% ash.

PREPARATION XII

The procedure according to Example I with the exception that 40 grams of dimethoxybenzene and 250 ml. of ethylene dichloride was added to 30 grams of the above-described beads with 1.36 grams zinc chloride. The dried reaction intermediate contained 81.37% C, 7.44% H, 4.37% residual chloride, 4.59% methoxyl and 0.45% ash. The methoxyl groups were cleaved with 47% hydriodic acid as described in Preparation I.

PREPARATION XIII

The procedure according to Preparation X with the exception that 40 grams hydroquinone and 250 ml. of dioxane was added to 30 grams of the above-described beads with 1.36 grams zinc chloride. The redox capacity of the final product was 3.7 meq./g.

PREPARATION XIV

The procedure according to Preparation V using a chloromethylated polystyrene-divinylbenzene prepared from a styrene-divinylbenzene copolymer containing 20% divinylbenzene. The chloromethylated copolymer contained 14.90% C, had a surface area of 45 sq. m./g., and a porosity of 45%. The dried reaction intermediate contained 9.48% methoxyl, 3.21% residual chloride and no ash. Methoxyl groups were cleaved with 47% hydriodic acid as described in Example I. The redox capacity of the final product was 2.8 meq./g.

PREPARATION XV

The procedure according to Preparation VIII with the exception that the chloromethylated beads described in Preparation XIV were used. The final product contained 79.89% C, 6.56% H, 8.25% residual chloride, 0.16% ash and 17.3% benzoquinone adduct.

PREPARATION XVI

The procedure according to Preparation V using a chloromethylated polystyrene-divinylbenzene prepared from a styrene-divinylbenzene copolymer containing 20% divinylbenzene. The chloromethylated copolymer contained 12.5% chloride, had a surface area of 80 sq. m./g. and a porosity of 30%. The dried reaction intermediate contained 8.78% methoxyl, 2.37% residual chloride and 0.45% ash. Methoxyl groups were cleaved with 47% hydriodic acid as described in Example I. The redox capacity of the final product is 2.6 meq./g.

Example I

One hundred and thirty grams of a hydroquinone adduct, prepared by the method described in Preparation X, where 2.32% of chloride was left unreacted, was swelled in 750 ml. of ethylene dichloride for one hour. The excess ethylene dichloride was removed from the swollen beads by filtration. Approximately 100 grams of ice was added to the beads in a reaction flask that was cooled to 0° C. To this mixture was added a slurry of 500 ml. of 24.5% trimethylamine in water and approximately 250 grams of ice. The reaction mixture was stirred for twenty hours. For the first six hours, the reaction was kept at 0° C. and allowed to slowly come to 14° C. at the end of the twenty hours. After adding 500 ml. of water to the reaction mixture, the slurry was heated. The reaction mixture was heated until the distillate temperature reached 100° C. and an additional 500 ml. of distillate was collected at 100° C. Thus, all the residual ethylene dichloride and trimethylamine were removed from the beads. Water was added, by a dropping funnel, during the distillation to keep the slurry mobile. A portion of the slurry was dried and this product contained 79.86% C, 6.12% H, 0.81% total chloride, 0.53% N, and 0.23% ash. This resin had a redox capacity of 2.04 meq./g. (dry) after being in contact with ceric ion for ten minutes, 4.63 meq./g. (dry) after one hour and 8.76 meq./g. (dry) after four hours.

Example II

Ninety-three grams of a hydroquinone adduct, prepared by the method described in Preparation X, was swelled in 800 ml. of ethylene dichloride. The slurry was cooled with an ice-water bath to 0° C. and 40.5 grams of chlorosulfonic acid was added drop-wise. The reaction temperature was kept below 5° C. The reaction mixture was allowed to stir at 0° C. for two hours, slowly allowed to come to room temperature over a period of one hour and then heated at 80° C. for two hours. The unreacted acid chloride was decomposed with water and the liquid phases were filtered away from the beads. One liter of water was added to the beads and the slurry was heated in a distillation apparatus until the distillate reached 100° C., thus removing all the ethylene dichloride. The beads were washed with water to remove all the unreacted acid. A portion of the slurry was dried and this product contained 66.99% C, 5.36% H, 3.43% Cl (from unreacted halomethyl groups), 3.88% S and 3.30% ash. This resin had a redox capacity of 2.44 meq./g. (dry) after being in contact with ceric ion for ten minutes, 7.28 meq./g. (dry) after one hour and 10.91 meq./g. (dry) after four hours.

Example III

Thirty grams of a 2,5-dimethylhydroquinone adduct, prepared by the method described in Preparation X was treated as described in Example II. The product contained 63.52% C, 5.15% H, 4.53% S, 1.95% Cl, and 3.10% ash. This resin had a redox capacity of 2.27 meq./g. (dry) after being in contact with ceric ion for ten minutes, 6.13 meq./g. (dry) after one hour, 10.69 meq./g. (dry) after 4.3 hours and 15.51 meq./g. (dry) after 27 hours.

Example IV

Fifty grams of a benzoquinone adduct prepared by the method described in Preparation XI was combined with 30 grams of dimethyl sulfide, 200 ml. of ethylene dichloride, 100 grams of methanol, and 50 grams of water, and the resulting mixture was heated at reflux with constant stirring for twelve hours. One liter of water was added to the beads, and the slurry was heated in a distillation apparatus until the distillate reached 100° C. After cooling, the drained beads were added to the solution of 25 grams of sodium hydroxide and 15 grams of thioglycolic acid in 100 ml. of water. The slurry was refluxed for 12 hours with constant stirring. The product was washed with 3 liters of water, followed by 500 ml. of 37% hydrochloric acid, then again with water until the water washings did not give a positive chloride test with silver nitrate. This resin had a redox capacity of 2.30 meq./gram (dry) after being in contact with ceric ion, 4.60 meq./gram (dry) after one hour, and 7.50 meq./gram (dry) after four hours.

Example V

One hundred and fifty grams of the chloromethylated poly(styrene-divinylbenzene) copolymer used in Preparation XIV was combined with 110 grams of hydroquinone, 750 ml. of dioxane and 20 grams of zinc chloride and heated at reflux for 12 hours. The hot dioxane solution was removed by filtration and the beads were washed twice with hot dioxane. The dioxane was replaced with 500 ml. of ethylene dichloride and the procedure described in Example II was followed. The product contained 76.52% C, 6.21% H, 2.70% Cl, 2.63% S and 1.03% ash. This resin had a redox capacity of 1.88 meq./g. (dry) after being in contact with ceric ion for ten minutes, 3.89 meq./g. (dry) after one hour, 6.17 meq./g. (dry) after 4.3 hours and 9.31 meq./g. (dry) after 27 hours.

*Example VI*

The procedure of Example V was employed with the exception that 50.0 grams of benzoquinone adduct prepared by the method described in Preparation VII, containing 17.85% unreacted chloride, was reacted with a slurry of 100 grams of 24.5% trimethylamine in water and 100 grams of ice. The product contained 64.26% C, 8.75% H, 12.56% total chloride, 4.77% N and no ash. This resin had a redox capacity of 1.23 meq./g. (dry) after being in contact with ceric ion for ten minutes, 3.15 meq./g. (dry) after one hour and 4.60 meq./g. (dry) after four hours.

*Example VII*

The procedure of Example I was employed with the exception that 50.0 grams of the benzoquinone adduct prepared by the method described in Preparation IX, containing 7.63% unreacted chloride, was reacted with a slurry of 100 grams of 24.5% trimethylamine in water and 100 grams of ice. The product contained 79.26% C, 7.15% H, 4.51% total chloride, 1.14% N and no ash. This resin had a redox capacity of 1.61 meq./g. (dry) after being in contact with ceric ion for ten minutes, 3.37 meq./g. (dry) after one hour and 5.24 meq./g. (dry) after four hours.

*Example VIII*

The procedure of Example I was employed with the exception that 50.0 grams of the benzoquinone adduct prepared by the method described in Preparations VII and IX using the chloromethylated poly(styrene-divinylbenzene) copolymer described in Preparation X, was reacted with a slurry of 100 grams of 24.5% trimethylamine in water and 100 grams of ice. The product contained 79.90% C, 6.85% H, 5.75% Cl, 2.13% N and no ash. The resin had a redox capacity of 3.08 meq./g. (dry) after being in contact with ceric ion for one hour and 6.20 meq./g. (dry) after four hours.

*Example IX*

The procedure of Example VIII was employed using 2,2′-iminodiethanol instead of trimethylamine. The product contained 74.32% C, 6.49% H, 4.34% Cl, 1.74% N, no ash, and had a redox capacity of 3.29 meq./g. (dry) after being in contact with ceric ion for an hour.

*Example X*

The procedure of Example VIII was employed using 2-methylaminoethanol instead of trimethylamine. The product contained 71.73% C, 6.78% H, 5.57% Cl, 2.80% N, no ash and had a redox capacity of 3.05 meq./g. (dry) after being in contact with ceric ion for one hour.

I claim:
1. A solid water-insoluble copolymer of
    a monoethylenically unsaturated monomer selected from the group consisting of styrene, α-methylstyrene, vinyl toluene and vinyl naphthalene, and
    a polyethylenically unsaturated monomer, said copolymer having covalently bonded solely through methylene linkages at least one member selected from the group consisting of quinones and hydroquinones, and at least one member selected from the group consisting of monomeric amines and carboxyl, each said methylene linkage having just one group which is either a redox or an ion exchange group,
    said polyethylenically unsaturated monomer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of resorcinol, polyallyl ether of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N′-methylenediacrylamide, N,N′-methylenedimethacrylamide, N,N′-methylenediacrylamide, N,N′-methylenedimethacrylamide, N,N′-ethylenediacrylamide, 1,2-bis(α-methylmethylene sulfonamido)ethylene, trivinylbenzene, trivinylnaphthalene, and polyvinylanthracene.

2. A copolymer as set forth in claim 1 in which the amine group is selected from the group consisting of primary, secondary and tertiary amine groups and consists of from 3% to 50% of the groups attached to the copolymer.

3. A copolymer as set forth in claim 1 in which the monoethylenically unsaturated monomer is styrene and polyethylenically unsaturated monomer is divinylbenzene.

4. A copolymer as set forth in claim 3 in which the divinylbenzene is from 1 to 55% of the total monomer mixture.

5. A solid insoluble copolymer of
    a monomer selected from the group consisting of styrene, vinyl toluene, α-methyl styrene and vinyl naphthalene, and
    a polyethylenically unsaturated monomer having attached to the chain of the copolymer through methylene linkages at least one of the groups consisting of quinones and hydroquinones, and at least one of the groups selected from the group consisting of monomeric amines and carboxyl, each said methylene linkage having just one group which is either a redox or an ion exchange group,
    said polyethylenically unsaturated monomer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of resorcinol, polyallyl ether of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N′-methylenediacrylamide, N,N′-methylenedimethacrylamide, N,N′-methylenediacrylamide, N,N′-methylenedimethacrylamide, N,N′-ethylenediacrylamide, 1,2-bis(α-methylmethylene sulfonamido)ethylene, trivinylbenzene, trivinylnaphthalene, and polyvinylanthracene.

6. A solid insoluble macroreticular-structured copolymer of
    a monoethylenically unsaturated monomer selected from the group consisting of styrene, α-methylstyrene, vinyl toluene and vinyl naphthalene, and
    a polyethylenically unsaturated monomer, said copolymer having covalently bonded solely through methylene linkages at least one member selected from the group consisting of quinones and hydroquinones, and at least one member selected from the group consisting of monomeric amines and carboxyl, each said methylene linkage having just one group which is either a redox or an ion exchange group, said polyethylenically unsaturated monomer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of resorcinol, polyallyl ether of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N' - methylenediacrylamide, N,N'-methylenedimethacrylamide, N,N'-methylenediacrylamide, N,N'-methylenedimethacrylamide, N,N'-ethylenediacrylamide, 1,2-bis(α-methylmethylene sulfonamido)ethylene, trivinylbenzene, trivinylnaphthalene, and polyvinylanthracene.

7. A copolymer as set forth in claim 6 in which the monoethylenically unsaturated monomer is selected from the group consisting of styrene, vinyl toluene, α-methyl styrene and vinyl naphthalene.

8. A copolymer as set forth in claim 6 in which the monoethylenically unsaturated monomer is styrene and the polyethylenically unsaturated monomer is divinylbenzene.

9. A copolymer as set forth in claim 8 in which the divinylbenzene constitutes from 1 to 55% of the total monomer mixture.

10. A solid insoluble macroreticular-structured copolymer of
a monoethylenically unsaturated monomer,
a polyethylenically unsaturated monomer selected from the group consisting of styrene, α-methylstyrene, vinyl toluene and vinyl naphthalene, and said copolymer having covalently bonded solely through methylene linkages at least one member selected from the group consisting of quinones and hydroquinones, and at least one member selected from the group consisting of monomeric amines and carboxyl, each said methylene linkage having just one group which is either a redox or an ion exchange group, and said polyethylenically unsaturated monomer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of resorcinol, polyallyl ether of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N' - methylenediacrylamide, N,N'-methylenedimethacrylamide, N,N'-methylenediacrylamide, N,N'-methylenedimethacrylamide, N,N'-ethylenediacrylamide, 1,2-bis(α-methylmethylene sulfonamido)ethylene, trivinylbenzene, trivinylnaphthalene, and polyvinylanthracene.

11. A copolymer as set forth in claim 10 in which the amine group is selected from the group consisting of primary, secondary and tertiary amines and consists of 5% to 30% of the groups attached to the copolymer.

12. A copolymer as set forth in claim 10 in which the monoethylenically unsaturated monomer is styrene and the polyethylenically unsaturated monomer is divinylbenzene.

13. A copolymer as set forth in claim 12 in which the divinylbenzene represents 1 to 55% of the monomer mixture.

14. A process for the preparation of hydrophilic redox copolymers which comprises
(A) copolymerizing
(1) a monoethylenically unsaturated monomer selected from the group consisting of styrene, α-methylstyrene, vinyl toluene and vinyl naphthalene, with
(2) a polyethylenically unsaturated monomer,
(B) halomethylating the copolymer resulting from (A),
(C) treating the halomethylated copolymer in the presence of a Friedel-Crafts reagent with a sufficient amount of a compound selected from the group consisting of quinones and hydroquinones so that from 95% to 70% of the halomethyl groups are reacted,
(D) treating the compound which results from (C) with a compound selected from the group consisting of monomeric amines and glycolic acid, and
(E) the polyethylenically unsaturated monomer having been selected from the group consisting of divinylbenzene, divinylpyridine, divinyltoluene, divinylnaphthalene, diallyl phthalate, ethylene glycol diacrylate, ethylene glycol dimethacrylate, divinylxylene, divinylethylbenzene, divinylsulfone, polyvinyl ether of glycol, polyallyl ether of glycol, polyvinyl ether of glycerol, polyallyl ether of glycerol, polyvinyl ether of pentaerythritol, polyallyl ether of pentaerythritol, polyvinyl ether of mono derivatives of glycol, polyallyl ether of mono derivatives of glycol, polyvinyl ether of resorcinol, polyallyl ether of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N' - methylenediacrylamide, N,N'-methylenedimethacrylamide, N,N'-methylenediacrylamide, N,N'-methylenedimethacrylamide, N,N'-ethylenediacrylamide, 1,2-bis(α-methylmethylene sulfonamido)ethylene, trivinylbenzene, trivinylnaphthalene, and polyvinylanthracene.

15. A process as set forth in claim 14 in which the amine is selected from the group consisting of primary, secondary and tertiary and consists of 5 to 30% of the groups attached to the copolymer.

16. A process as set forth in claim 14 in which the monoethylenically unsaturated monomer is styrene and the polyethylenically unsaturated monomer is divinylbenzene.

References Cited by the Examiner

UNITED STATES PATENTS

| | | | |
|---|---|---|---|
| 2,591,573 | 4/1952 | McBurney | 260—2.1 |
| 2,710,801 | 6/1955 | Minsk | 260—47 |
| 2,900,353 | 8/1959 | Cassidy | 260—49 |
| 3,037,052 | 5/1962 | Bortnick | 260—2.2 |

OTHER REFERENCES

Sansoni, Die Naturwissenschaften, vol. 39, page 281 (1952).

WILLIAM H. SHORT, *Primary Examiner.*

J. C. MARTIN, *Assistant Examiner.*